United States Patent
Nomura et al.

(10) Patent No.: US 9,787,162 B2
(45) Date of Patent: Oct. 10, 2017

(54) VIBRATION POWER GENERATOR

(75) Inventors: Hiromori Nomura, Tokyo (JP); Ken Onishi, Tokyo (JP); Masataka Bando, Tokyo (JP)

(73) Assignee: Mitsubishi Electric Engineering Company, Limited, Tokyo (JP)

( * ) Notice: Subject to any disclaimer, the term of this patent is extended or adjusted under 35 U.S.C. 154(b) by 161 days.

(21) Appl. No.: 14/397,763

(22) PCT Filed: May 2, 2012

(86) PCT No.: PCT/JP2012/061606
§ 371 (c)(1),
(2), (4) Date: Oct. 29, 2014

(87) PCT Pub. No.: WO2013/164892
PCT Pub. Date: Nov. 7, 2013

(65) Prior Publication Data
US 2015/0130298 A1   May 14, 2015

(51) Int. Cl.
*H02K 41/02* (2006.01)
*H02K 7/18* (2006.01)
(Continued)

(52) U.S. Cl.
CPC .......... *H02K 7/1876* (2013.01); *H02K 35/02* (2013.01); *H02P 9/00* (2013.01); *H02K 16/00* (2013.01); *H02K 2213/03* (2013.01)

(58) Field of Classification Search
CPC ........................... H02K 35/022; H02K 7/1876
See application file for complete search history.

(56) References Cited

U.S. PATENT DOCUMENTS 3,981,245 A * 9/1976 Buzzell .................. F42C 11/04
                                                  102/209
7,288,860 B2 * 10/2007 Cheung ................. H02K 35/02
                                                  290/1 R
(Continued)

FOREIGN PATENT DOCUMENTS

EP        0580117 A2    1/1994
JP         7-9081 U     2/1995
(Continued)

OTHER PUBLICATIONS

Machine Translation of Publication No. JP 2010-115077 A Applicant: Sony Corp. Published: May 20, 2010.
(Continued)

*Primary Examiner* — Dang Le
(74) *Attorney, Agent, or Firm* — Rothwell, Figg, Ernst & Manbeck, p.c.

(57) ABSTRACT

The vibration power generator includes: a plurality of permanent magnets (1, 2) integrated together to have given inter-magnet gaps under a state in which the same poles of the permanent magnets are opposed to each other; and a plurality of coils (3, 4) arranged on respective outer peripheries of the plurality of permanent magnets so as to have a distance from the plurality of permanent magnets, and is configured to generate an electric power through relative movement of the plurality of permanent magnets and the plurality of coils. A relationship between a length of the opposed coils and a length of the permanent magnet is set so that the length of the coils is larger than the length of the permanent magnet and equal to or smaller than a sum of the length of the permanent magnet and a length of the inter-magnet gap.

4 Claims, 15 Drawing Sheets

(51) Int. Cl.
*H02K 35/02* (2006.01)
*H02P 9/00* (2006.01)
*H02K 16/00* (2006.01)

(56) References Cited

U.S. PATENT DOCUMENTS

| | | | |
|---|---|---|---|
| 2005/0206247 A1 | 9/2005 | Stewart et al. | |
| 2008/0185982 A1* | 8/2008 | Iwasa | H02K 41/03 318/135 |
| 2010/0194117 A1* | 8/2010 | Pabon | H02K 35/02 290/1 R |

FOREIGN PATENT DOCUMENTS

| | | |
|---|---|---|
| JP | 2010-115077 A | 5/2010 |
| JP | 3163956 U | 11/2010 |
| JP | 2011-244645 A | 12/2011 |
| JP | 2012-60867 A | 3/2012 |
| WO | 2008/139646 A1 | 11/2008 |

OTHER PUBLICATIONS

European Search Report for EP 12875923.0 dated May 20, 2016, 8 pages.

\* cited by examiner

VIBRATION POWER GENERATOR

CROSS REFERENCE TO RELATED APPLICATIONS

This application is a 35 U.S.C. §371 National Phase Entry Application from PCT/JP2012/061606, filed May 2, 2012, and designating the United States, which is incorporated herein by reference in its entirety.

TECHNICAL FIELD

The present invention relates to a vibration power generator configured to use a magnet and a conductive coil to utilize an electric power to be generated by relative vibration of the magnet and the conductive coil.

BACKGROUND ART

When a magnet is vibrated so that the magnet passes through the inside of a conductive coil, an induced current flows in the coil to generate an electromotive force. The electromotive force is generally small on the order of milliwatts. A conceivable method for enhancing the electromotive force is to use a plurality of magnets and a plurality of coils.

As a related art, there is given one generator including a plurality of coils arranged around magnets in which the same poles are opposed to each other, and the magnets and the coils are desired to have equal lengths and be arranged at equal intervals (see, for example, Patent Literature 1). Then, when a gap between the magnets is halved, a larger electromotive force may be obtained.

As another related art, there is also given a vibration power generator configured to use a plurality of permanent magnets and a plurality of coils surrounding the permanent magnets to generate an electric power through relative movement with vibration. In the vibration power generator, the permanent magnets are arranged so that the same poles are opposed to each other, and integrated together to have a gap therebetween, and the plurality of coils are arranged on the outer peripheries of the plurality of permanent magnets so as to have a distance from the permanent magnets. The plurality of coils wound in opposite directions are alternately arranged, and the length of each coil is set to 70% to 90% of the length of the permanent magnet (see, for example, Patent Literature 2). In Patent Literature 2, FIGS. 4 and 9 show that the electromotive force is enhanced.

CITATION LIST

Patent Literature

[PTL 1] JP 4684106 B
[PTL 2] JP 4704093 B

SUMMARY OF INVENTION

Technical Problem

The related arts, however, have the following problems.

In Patent Literature 1, there is no sufficient quantitative description that the magnets and the coils are desired to have equal lengths and be arranged at equal intervals.

In the vibration power generator disclosed in Patent Literature 2, the length of the coil is smaller than the length of the permanent magnet. Thus, as compared to the case where a coil having the same length as the permanent magnet is used, if the coil is produced under the same conditions, there is a problem in that the electromotive force becomes smaller because the number of turns of the coil is reduced.

In free vibration using a spring or the like, there is a problem in that the electromotive force becomes smaller when the amplitude is so small that the coil cannot cross the vicinity of an edge of the permanent magnet at which magnetic flux density is large.

The present invention has been made in order to solve the problems described above, and it is an object thereof to provide a vibration power generator including at least one permanent magnet and a plurality of coils and capable of generating a larger electromotive force than hitherto through relative movement or free vibration.

Solution to Problem

According to one embodiment of the present invention, there is provided a vibration power generator including: a plurality of permanent magnets integrated together to have given inter-magnet gaps under a state in which the same poles of the permanent magnets are opposed to each other; and a plurality of coils arranged on respective outer peripheries of the plurality of permanent magnets so as to have a distance from the plurality of permanent magnets, the vibration power generator being configured to generate an electric power through relative movement of the plurality of permanent magnets and the plurality of coils. A relationship between a length of the opposed coils and a length of the permanent magnet is set so that the length of the coils is larger than the length of the permanent magnet and equal to or smaller than a sum of the length of the permanent magnet and a length of the inter-magnet gap.

Advantageous Effects of Invention

According to the vibration power generator according to one embodiment of the present invention, the relationship between the length of the opposed coils and the length of the permanent magnet is set so that the length of the coils is larger than the length of the permanent magnet and equal to or smaller than the sum of the length of the permanent magnet and the length of the inter-magnet gap. Thus, in minute vibration, the coils are allowed to cross the vicinity of the edge of the permanent magnet at which magnetic flux density is large. Consequently, it is possible to provide the vibration power generator including at least one permanent magnet and the plurality of coils and capable of generating a larger electromotive force than hitherto through relative movement or free vibration.

DESCRIPTION OF EMBODIMENTS

The technical feature of the present invention resides in that the object of enhancing an electromotive force to be generated by electromagnetic induction due to relative vibration of a magnet and a coil is achieved by utilizing a shortened inter-coil gap to set the length of a coil to be larger than the length of a permanent magnet and equal to or smaller than the sum of the length of the permanent magnet and the length of an inter-magnet gap.

More specifically, the first approach is to utilize a shortened inter-magnet gap to set the length of the coil to be larger than the length of the magnet, to thereby enhance the electromotive force. The second approach is to utilize a shortened inter-magnet gap to arrange two or more divided coils for each magnet, to thereby efficiently extract a change in magnetic flux density to enhance the electromotive force. Note that, those two approaches may be used in combination.

First Embodiment

Figure 1:
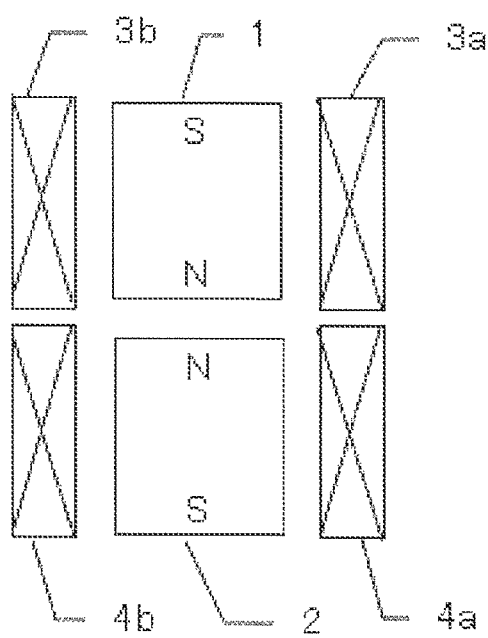
FIG. 1 is a schematic sectional view of portions of magnets and coils of a vibration power generator according to a first embodiment of the present invention.

FIG. 1 is a schematic sectional view of portions of magnets and coils of a vibration power generator according to a first embodiment of the present invention. Referring to FIG. 1, columnar or cylindrical permanent magnets (hereinafter referred to as "magnets") 1 and 2 are arranged so that the same poles are opposed to each other. In addition, the magnets 1 and 2 are surrounded by a coil 3 (3a and 3b) and a coil 4 (4a and 4b).

In this case, the magnets 1 and 2 each have a diameter of 10 mm, a length of 9 mm, and an inter-magnet distance (gap) of 3 mm. The coils 3 and 4 each have a length of 11 mm and an inter-coil distance (gap) of 1 mm. As the distance between the magnet 1 and the coil 3 or the distance between the magnet 2 and the coil 4 becomes smaller, a larger change occurs in magnetic flux density of the coil. This means that the electromotive force becomes larger in inverse proportion to the distance.

Figure 2:
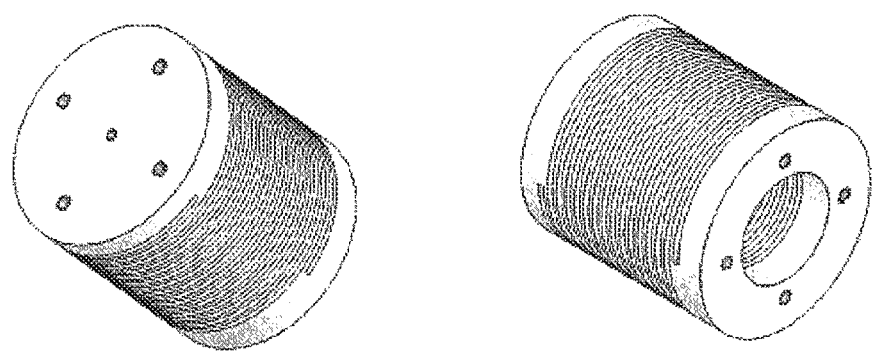
FIG. 2 is an explanatory view relating to a spring according to the first embodiment of the present invention.

FIG. 2 is an explanatory view relating to a spring according to the first embodiment of the present invention. Specifically, FIG. 2 is an external view of a spring called "machined spring" as an example of housing the magnets 1 and 2 and the coils 3 and 4, as viewed from obliquely above and obliquely below. An integrated unit of the magnets 1 and 2 of FIG. 1 is mounted on the inside of the spring and is vibrated. The coils 3 and 4 are fixed at a downward position to surround the magnets 1 and 2.

Figure 3:
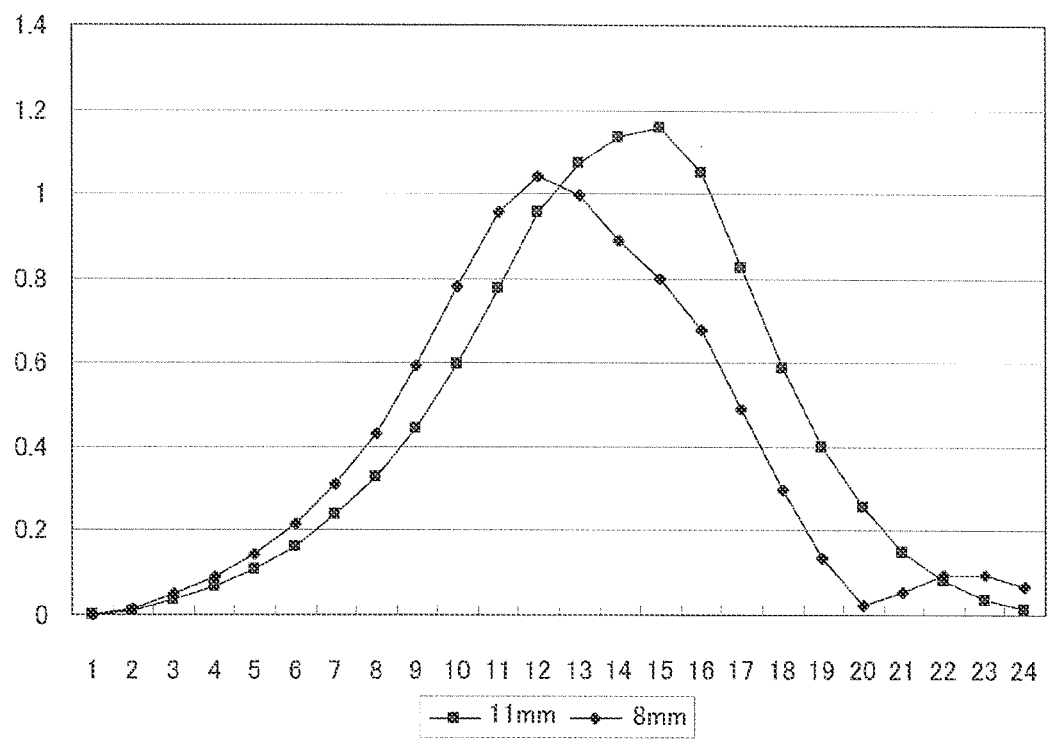
FIG. 3 is a graph showing simulation results of an electromotive force of the vibration power generator according to the first embodiment of the present invention.

FIG. 3 is a graph showing simulation results of the electromotive force of the vibration power generator according to the first embodiment of the present invention. Specifically, the simulation results show a half-cycle electromotive force generated when the spring is vibrated to move upward and downward by 12 mm. The graph shows a DC component of the electromotive force generated in the coil 3 when the length of the coil is 11 mm and 8 mm. In this case, the coil is wound to have the same number of turns per unit length.

Note that, FIG. 1 illustrates a stationary state, and hence the spring moves upward and downward around the illustrated position. The value of the electromotive force on the vertical axis of FIG. 3 is not an absolute value but a relative comparison value. The horizontal axis is the time axis in which the time period required for the movement of 12 mm is divided into 24 equal segments.

The graph of FIG. 3 shows that the electromotive force of the 11-mm coil is larger than that of the 8-mm coil by 15%. In this case, 12 mm is the sum of the length of 9 mm of each of the magnets 1 and 2 and the inter-magnet gap of 3 mm. Thus, for a larger vibration than 12 mm, the electromotive force periodically changes to maintain the tendency shown in FIG. 3, and hence the 11-mm coil generates a larger electromotive force.

Figure 4:
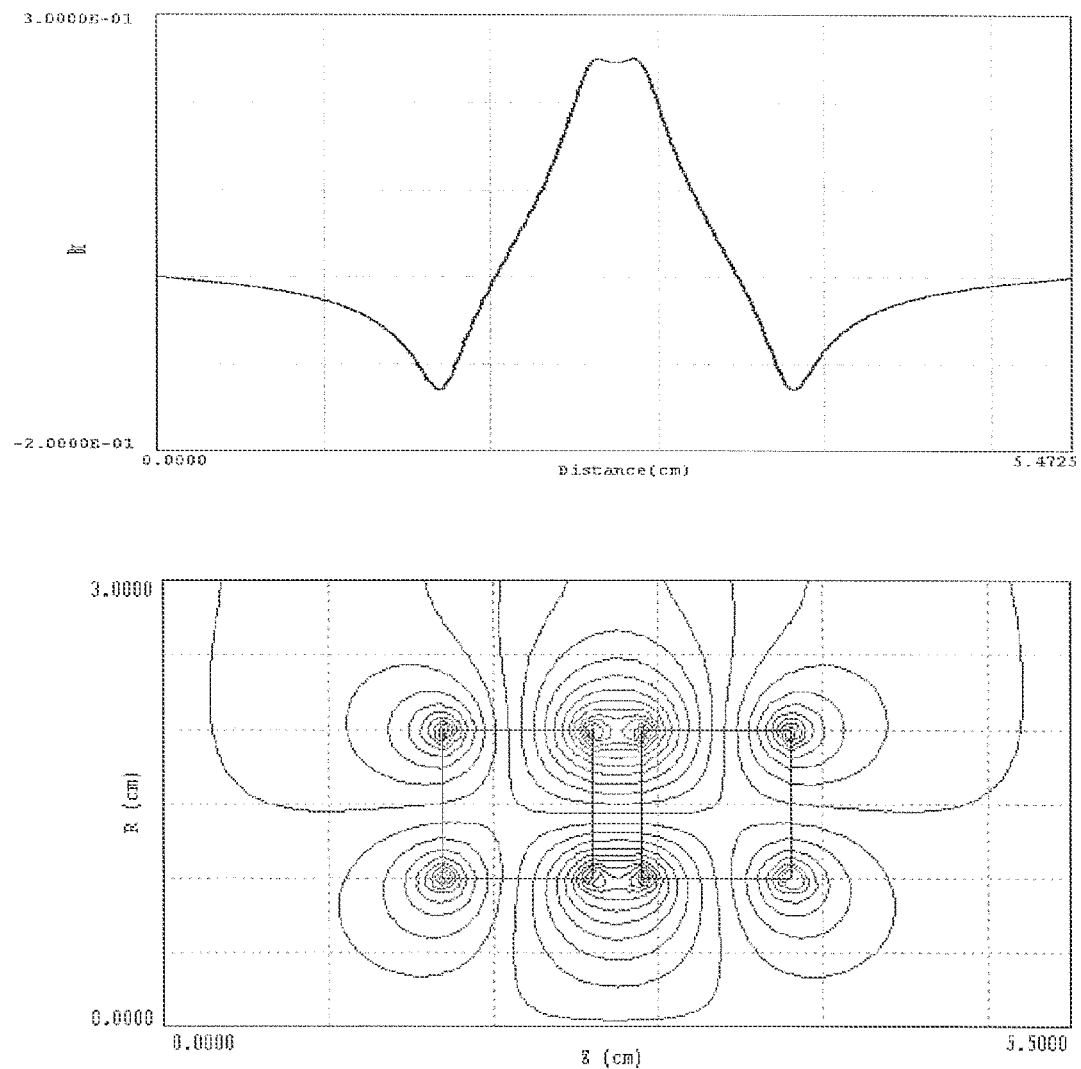
FIG. 4 shows simulation results of distribution of magnetic flux density obtained by the magnets illustrated in FIG. 1 according to the first embodiment of the present invention.

FIG. 4 shows simulation results of distribution of magnetic flux density obtained by the magnets 1 and 2 illustrated in FIG. 1 according to the first embodiment of the present invention. When a neodymium magnet is used, magnetic flux density for each magnet is approximately 0.5 tesla. Provided that the surroundings are filled with the air, the magnetic flux density on the line apart from the magnet by 1 mm is measured as shown in the upper graph of FIG. 4.

The contour lines in the lower graph of FIG. 4 show the areas of equal magnetic flux density. In the upper graph, the magnet edges at the middle at which the same poles are opposed to each other have high magnetic flux density, and the outer edges of the magnets have lower magnetic flux density than that at the middle (compared in absolute values).

The electromotive force is proportional to the change in magnetic flux density, and hence the electromotive force becomes larger when the coil crosses the middle edges of the magnets at which the magnetic flux density changes with an abrupt inclination. The change in magnetic flux density becomes more abrupt as the absolute value of the magnetic flux density becomes larger, and hence a larger electromotive force is generated.

For small vibration, although depending on the position of the 8-mm coil, the electromotive force becomes smaller if the 8-mm coil does not cross the vicinity of the edges of the magnets 1 and 2 based on the distribution of the magnetic flux density of FIG. 4.

As described above, according to the first embodiment, the inter-magnet gap of the plurality of magnets is reduced, and the length of the coil is set to be larger than the length of the magnet so as to reduce the inter-coil gap as much as possible. Consequently, in minute vibration, the coil crosses the vicinity of the edge of the permanent magnet at which the magnetic flux density is large, and hence there is an effect that a larger electromotive force than hitherto is generated and the electromotive force becomes larger than hitherto even in minute vibration.

Second Embodiment

Figure 5:
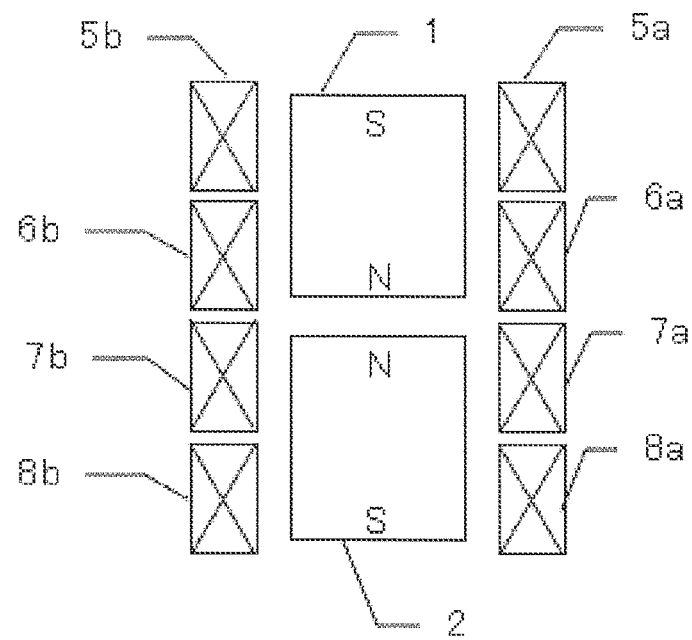
FIG. 5 is a schematic sectional view of portions of magnets and coils of a vibration power generator according to a second embodiment of the present invention.

FIG. 5 is a schematic sectional view of portions of magnets and coils of a vibration power generator according to a second embodiment of the present invention. Referring to FIG. 5, the number of coils for each magnet is two, and the inter-coil gap is reduced so that an edge of the coil on one side is arranged in the vicinity of the magnet edge in the stationary state.

In the coil longer than the magnet, the change in magnetic flux density, that is, the differential coefficient has the same polarity depending on the position, which affects the electromotive force. The electromotive force is proportional to the change in magnetic flux density in the entire coil, and hence as shown in FIG. 4, the electromotive force may be more efficiently extracted as the length of the coil becomes smaller.

Figure 6:
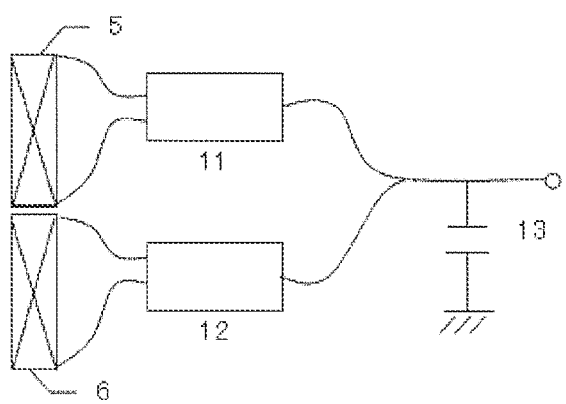
FIG. 6 is an explanatory diagram for extracting an electromotive force from the configuration of FIG. 5 according to the second embodiment of the present invention.

FIG. 6 is an explanatory diagram for extracting the electromotive force from the configuration of FIG. 5 according to the second embodiment of the present invention. Specifically, FIG. 6 is a block diagram for generating a DC voltage at a terminal of a capacitor 13 via rectifier circuits 11 and 12 from both terminals of divided coils 5 (5a, 5b) and 6 (6a, 6b).

Figure 7:
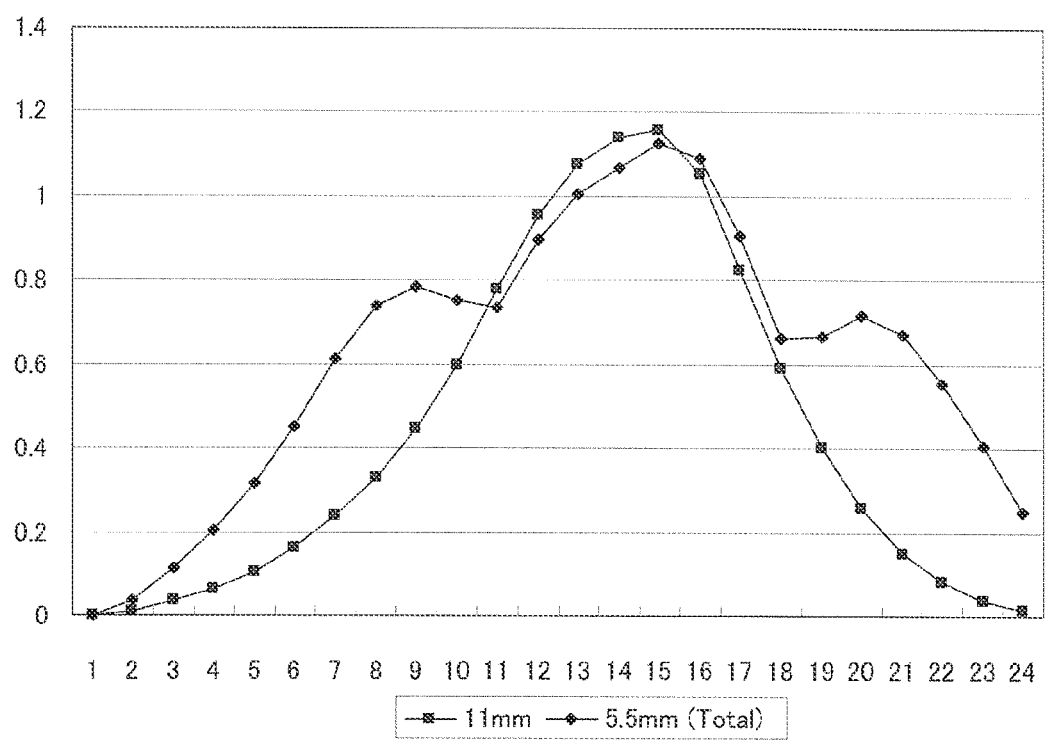
FIG. 7 is a graph showing simulation results of the electromotive force of the vibration power generator according to the second embodiment of the present invention.

FIG. 7 is a graph showing simulation results of the electromotive force of the vibration power generator according to the second embodiment of the present invention. Specifically, similarly to FIG. 3, the simulation results show the electromotive force generated when the number of coils for each magnet is one and two in the case where the spring is subjected to free vibration by the half cycle of 12 mm.

The electromotive force of the configuration of FIG. 5 is generated by combining the coil 5 and the coil 6, and hence has three peaks. Consequently, the obtained electromotive force was 1.4 times as large as the case where a single coil longer than the length of the magnet was used as in the first embodiment.

As described above, according to the second embodiment, the shortened inter-magnet gap is utilized to arrange two or more coils for each magnet. Consequently, as compared to the configuration of the first embodiment, the total number of turns of the coils can be increased, and the change in magnetic flux density can be efficiently extracted owing to the shortened coil length, to thereby enhance the electromotive force.

Third Embodiment

In a third embodiment of the present invention, a detailed description is given of measurement results of the electromotive force generated by the vibration power generator having the configurations of the magnets and the coils described in the first and second embodiments mounted thereon.

Figure 8:
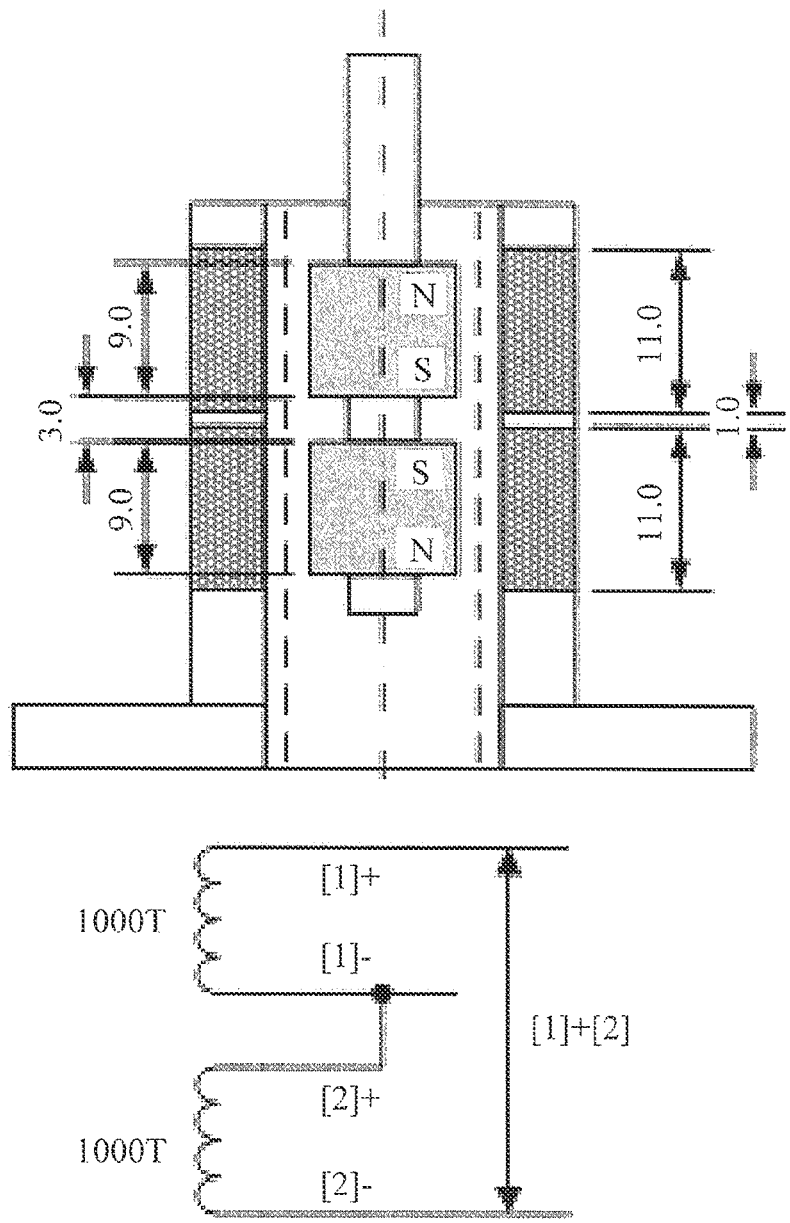
FIG. 8 is a structural sectional view of a vibration power generator having the configurations of the magnets and the coils described in the first embodiment mounted thereon and an equivalent circuit thereof according to a third embodiment of the present invention.

FIG. 8 is a structural sectional view of the vibration power generator having the configurations of the magnets and the coils described in the first embodiment mounted thereon and an equivalent circuit thereof according to the third embodiment of the present invention. FIG. 8 is a sectional view in which an integrated magnet unit is mounted on the inside of the spring illustrated in FIG. 2, and two coils are mounted on the bottom. The coils were each wound with 1,000 turns (T) in opposite directions, and the electromotive force was measured at end portions of the coils and at end portions of 2,000 turns (T) of the coils.

Figure 9:
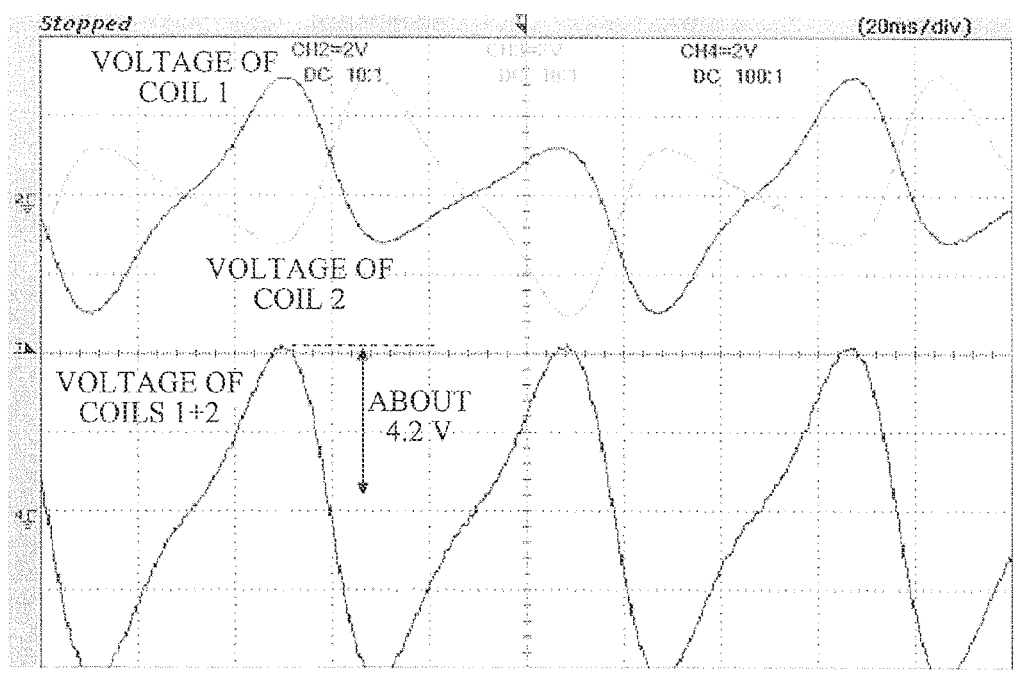
FIG. 9 is a waveform diagram showing measurement results of an electromotive force generated by the circuit of FIG. 8 according to the third embodiment of the present invention.

FIG. 9 is a waveform diagram showing measurement results of the electromotive force generated by the circuit of FIG. 8 according to the third embodiment of the present invention. Each coil has the peaks of approximately ±3 V and approximately ±1.2 V, and the waveform thereof is repeated. Then, a combined voltage of the coils was approximately ±4.2 V.

Figure 10:
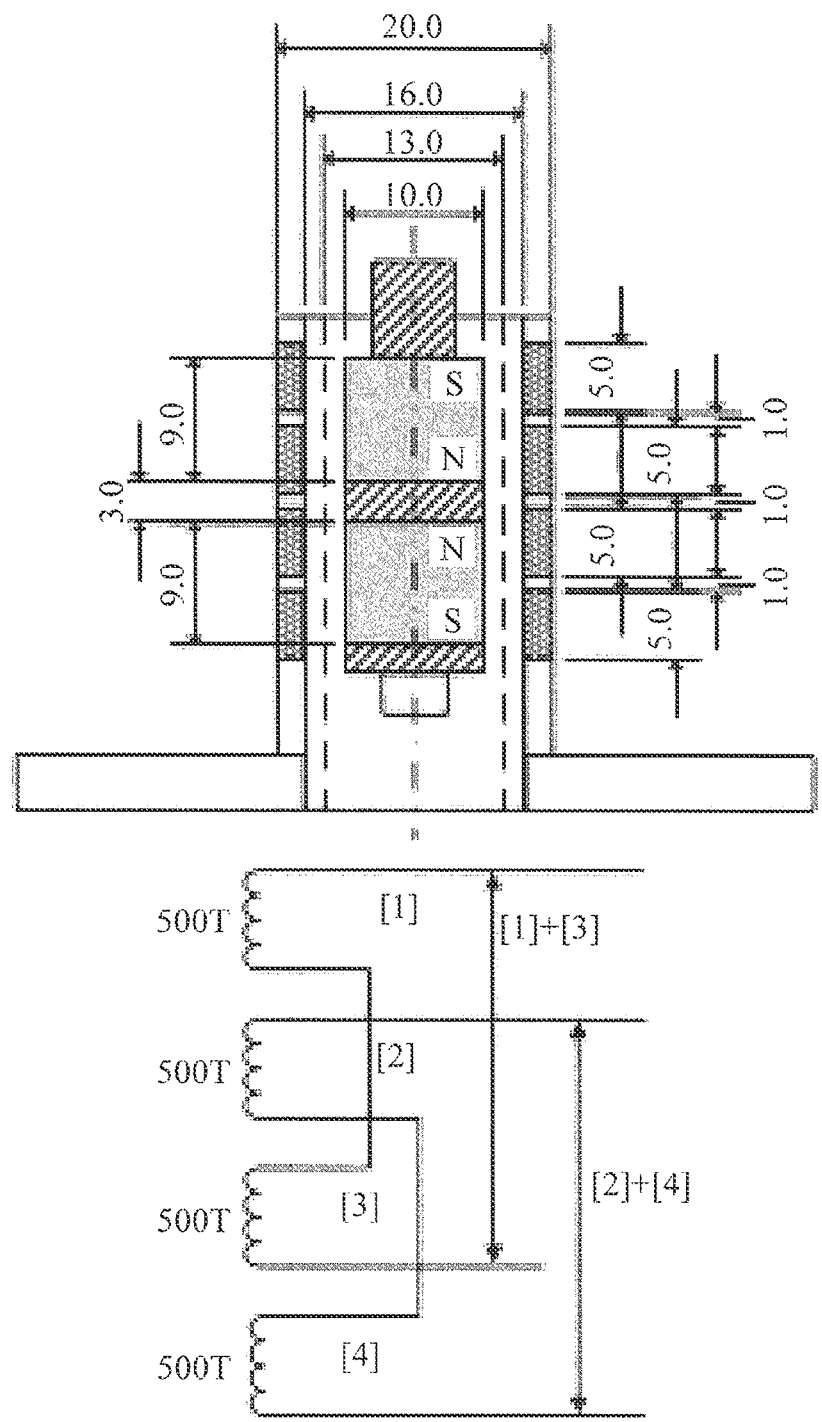
FIG. 10 is a structural sectional view of a vibration power generator having the configurations of the magnets and the coils described in the second embodiment mounted thereon and an equivalent circuit thereof according to the third embodiment of the present invention.

FIG. 10 is a structural sectional view of the vibration power generator having the configurations of the magnets and the coils described in the second embodiment mounted thereon and an equivalent circuit thereof according to the third embodiment of the present invention. Referring to FIG. 10, four coils were mounted with 500 turns (T) each. The coils are wound in the same direction within the magnet and in the opposite directions between the magnets.

Figure 11:
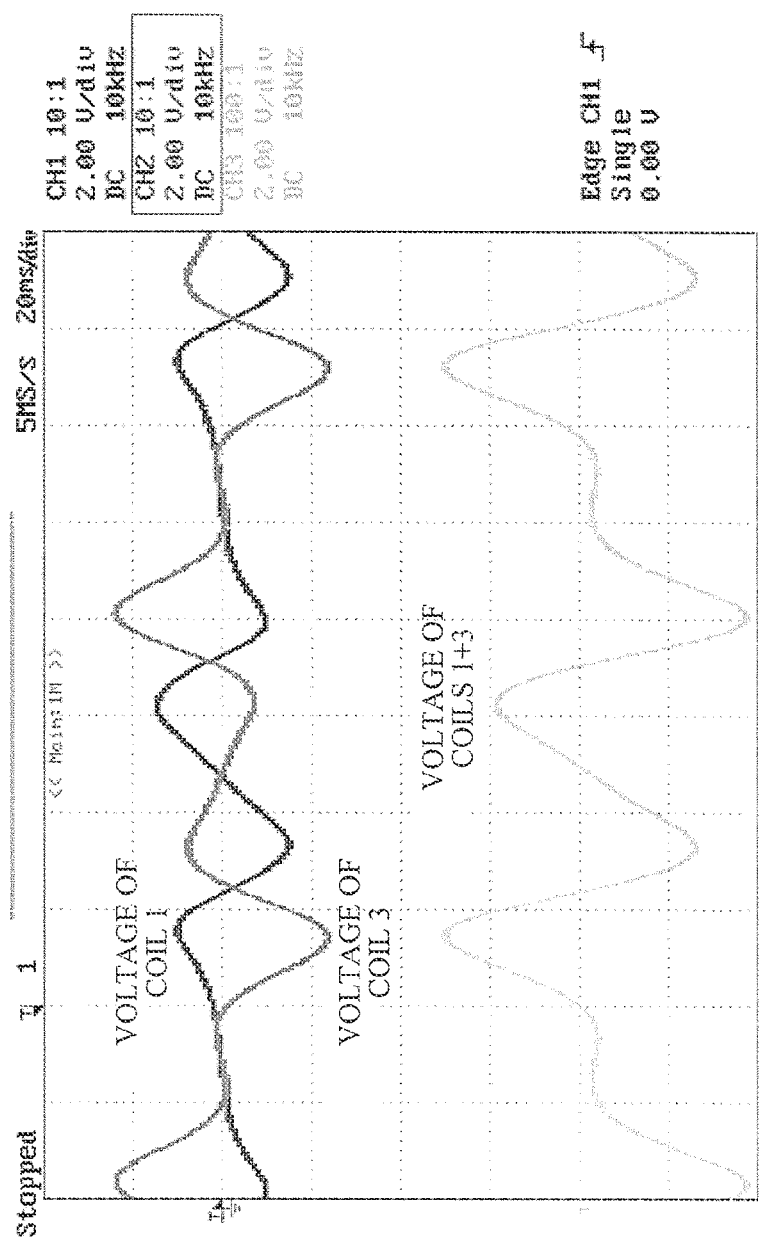
FIG. 11 is a waveform diagram showing measurement results of an electromotive force generated by the circuit of FIG. 10 according to the third embodiment of the present invention.
Figure 12:
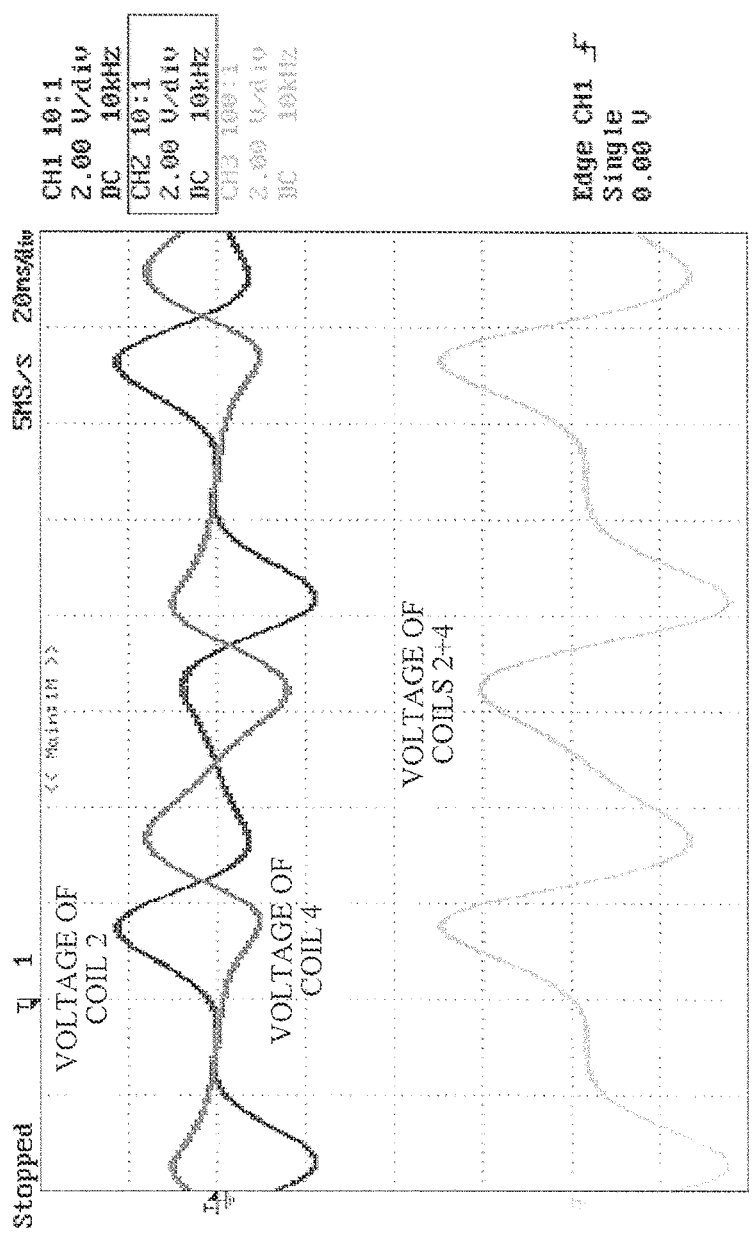
FIG. 12 is another waveform diagram showing the measurement results of the electromotive force generated by the circuit of FIG. 10 according to the third embodiment of the present invention.

FIGS. 11 and 12 are waveform diagrams showing measurement results of the electromotive force generated by the circuit of FIG. 10 according to the third embodiment of the present invention. Specifically, FIG. 11 shows measurement results for [1], [3], and [1]+[3] of FIG. 10. Each coil has the peaks of approximately ±2.4 V and approximately ±0.8 V. For [1]+[3], the coils have the peaks of approximately ±3.4 V and approximately ±2.2 V.

FIG. 12 shows measurements results for [2], [4], and [2]+[4] of FIG. 10, and substantially the same results as those of FIG. 11 are obtained. The combined result of the electromotive forces of each of FIGS. 11 and 12 is apparently larger than the combined result of the electromotive forces of FIG. 9, and matches with the simulation results shown in FIG. 7.

As described above, according to the third embodiment, the validity of the simulation results in the first and second embodiments was able to be verified based on the actual measured values.

Fourth Embodiment

In a fourth embodiment of the present invention, a description is given of a wireless transmission device to which the vibration power generator of the present invention is applied.

Figure 13:
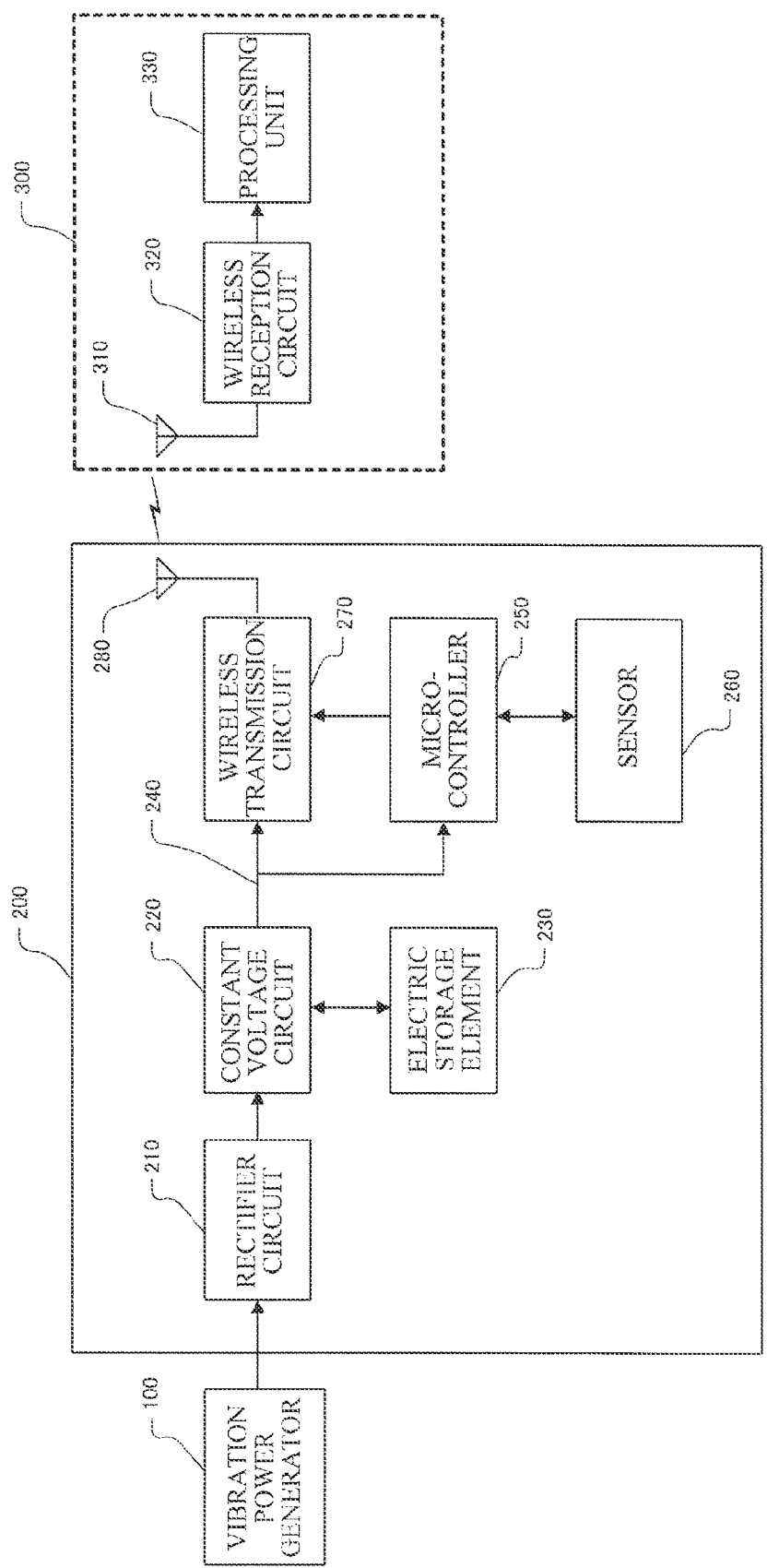
FIG. 13 is a block diagram of a wireless transmission device using the vibration power generator according to a fourth embodiment of the present invention.

FIG. 13 is a block diagram of the wireless transmission device using the vibration power generator according to the fourth embodiment of the present invention. The wireless transmission device illustrated in FIG. 13 includes a vibration power generator 100, a wireless sensor device 200, and a data reception unit 300.

Then, the wireless sensor device 200 includes a rectifier circuit 210, a constant voltage circuit 220, an electric storage element 230, a microcontroller 250, a sensor 260, a wireless transmission circuit 270, and an antenna 280. The data reception unit 300 includes an antenna 310, a wireless reception circuit 320, and a processing unit 330.

Next, an operation of the wireless transmission device is described. The vibration power generator 100 outputs an electromotive force generated by electromagnetic induction based on vibration applied from the outside, and inputs the generated electromotive force to the wireless sensor device 200. The rectifier circuit 210 included in the wireless sensor device 200 converts and rectifies the electromotive force input from the vibration power generator 100 from an AC electric power as shown in FIGS. 11 and 12 into a DC electric power.

The constant voltage circuit 220 stores the DC electric power input from the rectifier circuit 210 into the electric storage element 230 such as a capacitor, and steps up or down the DC electric power so as to be a constant voltage, to thereby generate a supply voltage 240.

The microcontroller 250 uses the supply voltage 240 supplied from the constant voltage circuit 220 to process measurement data obtained periodically from the sensor 260, and outputs the processed measurement data to the wireless transmission circuit 270. The wireless transmission circuit 270 uses the supply voltage 240 supplied from the constant voltage circuit 220 to transmit measurement information input from the microcontroller 250 as wireless information from the antenna 280.

On the other hand, the data reception unit 300 performs reception processing on a wireless signal transmitted from the wireless sensor device 200. Specifically, the wireless reception circuit 320 included in the data reception unit 300 receives via the antenna 310 the wireless signal that is periodically transmitted from the wireless sensor device 200, and outputs the wireless signal to the processing unit 330.

The processing unit 330 extracts measurement data from the received data input from the wireless reception circuit 320, and accumulates and displays the measurement data. Note that, the processing unit 330 may be constructed by an apparatus including a processing device such as a microcontroller and a display unit such as an LCD, or a personal computer.

As described above, according to the fourth embodiment, the vibration power generator of the present invention can be applied to the wireless transmission device. Besides, by fixedly mounting springs on both sides of the magnet, the vibration power generator of the present invention can be applied to the applications for any vibration direction. In addition, by mounting a secondary cell, the vibration power generator of the present invention can be used as a charger.

Fifth Embodiment

In a fifth embodiment of the present invention, a description is given of the case where a yoke is inserted between the magnets instead of an air layer to improve the magnetic flux density, to thereby enhance the electromotive force.

Figure 14:
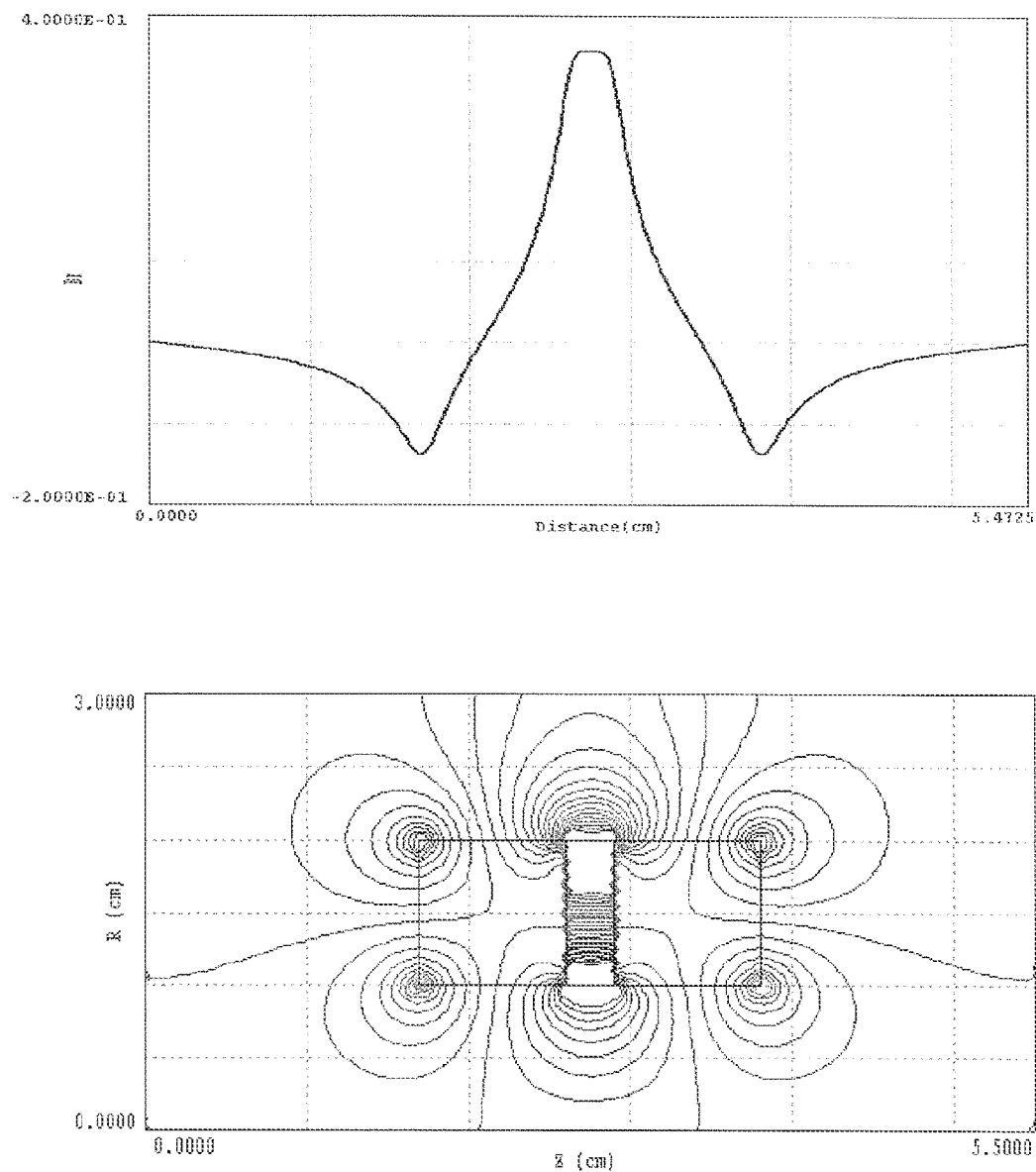
FIG. 14 shows simulation results of distribution of magnetic flux density when a yoke is arranged between magnets according to a fifth embodiment of the present invention.

FIG. 14 shows simulation results of distribution of the magnetic flux density when the yoke is arranged between the magnets according to the fifth embodiment of the present invention. More specifically, the simulation results show the distribution of the magnetic flux density when a columnar yoke (corresponding to material having relative permeability of more than 1) is inserted between the magnets instead of the air layer.

With the yoke inserted, the magnetic flux concentrates on the yoke surface, with the result that the magnetic flux density between the magnets becomes larger. The peak value of FIG. 14 is approximately 0.36 tesla, which is 1.44 times as large as 0.25 tesla of FIG. 4 measured with no yoke inserted.

Figure 15:
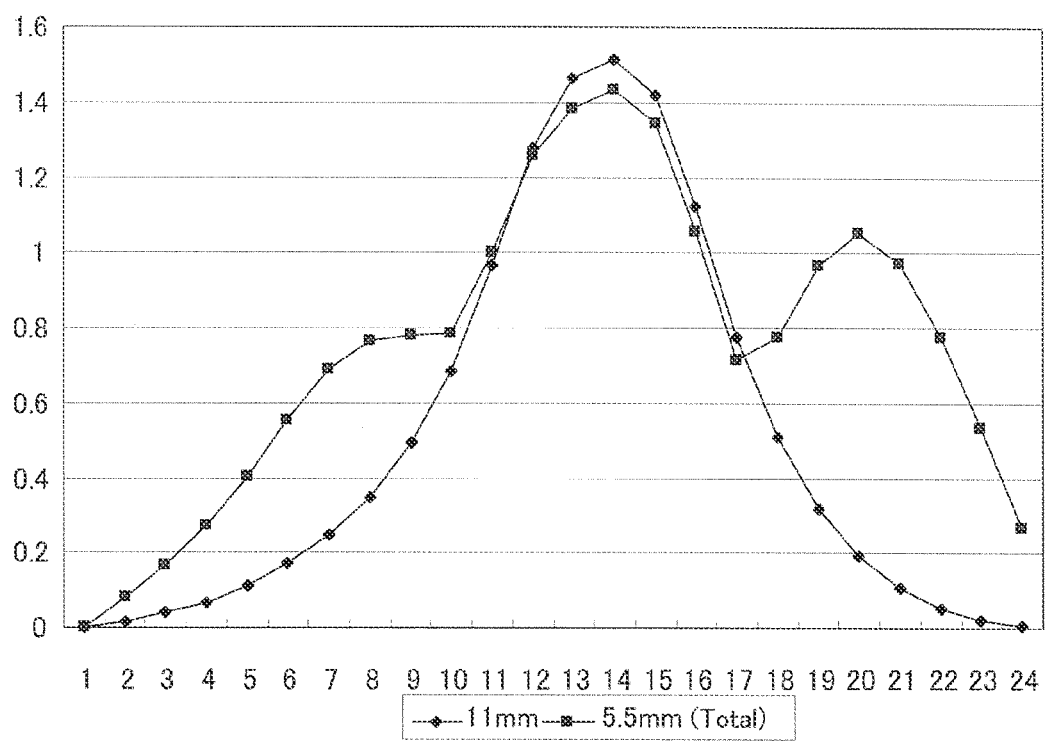
FIG. 15 is a graph showing simulation results of an electromotive force of a vibration power generator according to the fifth embodiment of the present invention.

FIG. 15 is a graph showing simulation results of the electromotive force of the vibration power generator according to the fifth embodiment of the present invention. Specifically, the simulation results show the electromotive force generated when the number of coils for each magnet is one and two with respect to the magnetic flux density of FIG. 14. The divided 5.5-mm coils were able to obtain a total electromotive force that was 1.51 times as large as the electromotive force of the not-divided 11-mm coil.

Further, the 11-mm coil and the 5.5-mm coils were able to obtain electromotive forces that were 1.14 times and 1.22 times as large as those of FIG. 7 using no yoke.

Figure 16:
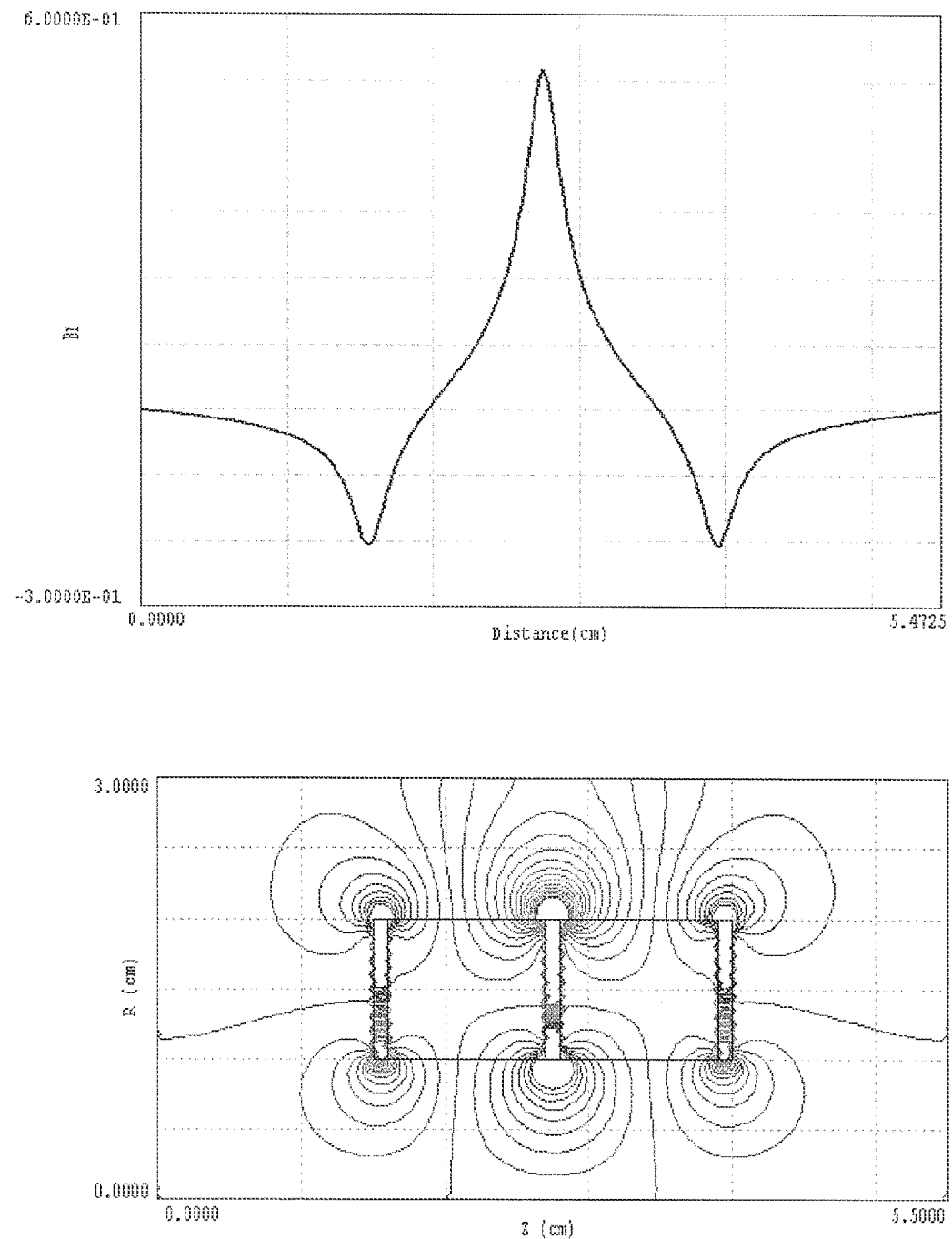
FIG. 16 shows simulation results of distribution of magnetic flux density when an inter-magnet gap is changed and yokes are arranged at three locations according to the fifth embodiment of the present invention.

FIG. 16 shows simulation results of distribution of the magnetic flux density when the inter-magnet gap is changed and the yokes are arranged at three locations according to the fifth embodiment of the present invention. The configuration of FIG. 16 aims at further enhancing the electromotive force by setting the magnet length to 11 mm and the inter-magnet gap to 1 mm and arranging the yokes between the magnets and at both ends of the magnets. The peak magnetic flux density in this case is approximately 0.54 tesla, which reaches 1.44 times as large as the case of FIG. 14 in which the yoke is arranged only at one location between the magnets.

Figure 17:
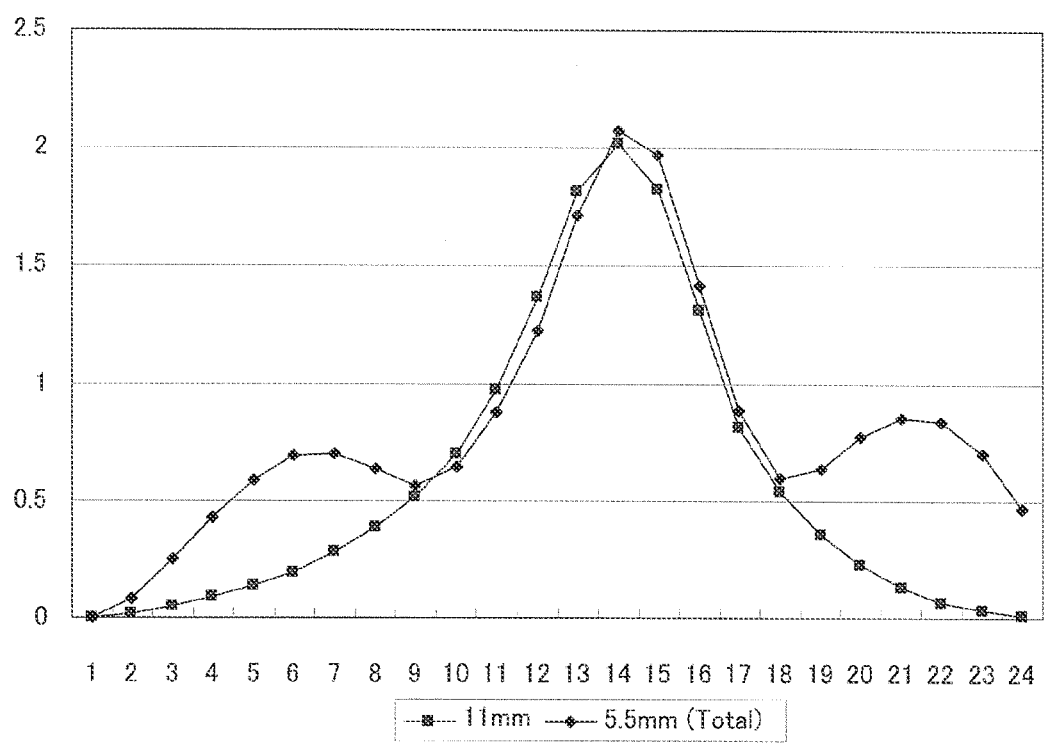
FIG. 17 is a graph showing simulation results of an electromotive force of the vibration power generator according to the fifth embodiment of the present invention.

FIG. 17 is a graph showing simulation results of the electromotive force of the vibration power generator according to the fifth embodiment of the present invention. Specifically, the simulation results show the electromotive force generated when the number of coils for each magnet is one and two with respect to the magnetic flux density of FIG. 16. The divided 5.5-mm coils were able to obtain a total electromotive force that was 1.41 times as large as the electromotive force of the not-divided 11-mm coil.

Further, the 11-mm coil and the 5.5-mm coils were able to obtain electromotive forces that were 1.16 times and 1.09 times as large as those of FIG. 15 in which the yoke was arranged only at one location between the magnets.

As described above, according to the fifth embodiment, the yoke is inserted between the magnets instead of the air layer. Consequently, in addition to the effects of the first and second embodiments, the electromotive force can be enhanced due to the improvement of magnetic flux density.

Note that, the case where the number of magnets is two has been described above in the embodiments, but it should be understood that the same effects can be expected even when the number of magnets is three or more. The case where the coil is divided into two pieces has been described above, but the coil may be divided into three or more pieces. The inter-coil gap may be eliminated.

The invention claimed is:

1. A vibration power generator, comprising:

a plurality of permanent magnets integrated together to have given inter-permanent magnet gaps under a state in which the same poles of the plurality of permanent magnets are opposed to each other; and a plurality of coils arranged on respective outer peripheries of the plurality of permanent magnets so as to have a distance from the plurality of permanent magnets, the vibration power generator being configured to generate an electric power through relative movement of the plurality of permanent magnets and the plurality of coils, wherein, of the plurality of coils, the coil opposed to each of the plurality of permanent magnets comprises divided coils that are divided into N pieces, where N is equal to or greater than 2, so as to have a given inter-coil gap between the coils, and wherein a relationship between a length of the divided coils opposed to each other and a length of the permanent magnet is set so that the length of the divided coils is equal to or more than 1/N of the length of the permanent magnet and equal to or less than 1/N of a sum of the length of the permanent magnet and a length of the inter-permanent magnet gap.

2. A vibration power generator according to claim 1, including a spring, wherein the plurality of permanent magnets can be subjected to vibration from the spring, to generate an electric power, and wherein one end of each of two coils among the N divided coils opposed to each of the plurality of permanent magnets is located on an outer periphery of an end portion of each of the plurality of permanent magnets or at a position of the inter-permanent magnet gap in a stationary state.

3. A vibration power generator according to claim 1, further comprising a material having a relative permeability of more than 1 inserted between the plurality of permanent magnets and at end portions of the plurality of permanent magnets.

4. A vibration power generator according to claim 1, wherein the N divided coils are each connected in series to the N divided coils arranged on the outer peripheries of adjacent ones of the plurality of permanent magnets, and wherein the vibration power generator further comprises N rectifier circuits for inputting a coil output.

* * * * *